Figures 1, 2:
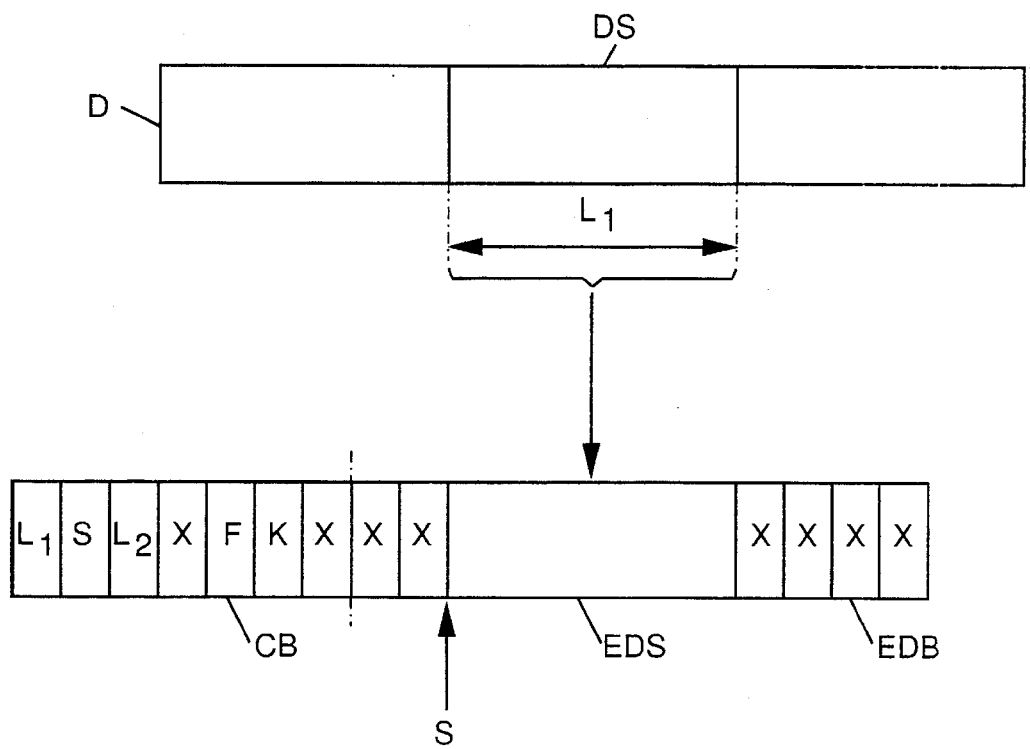

United States Patent [19]
Yorke-Smith

[11] Patent Number: 5,548,648
[45] Date of Patent: Aug. 20, 1996

[54] ENCRYPTION METHOD AND SYSTEM

[75] Inventor: Ian E. Yorke-Smith, Chandlers Ford, United Kingdom

[73] Assignee: International Business Machines Corporation, Armonk, N.Y.

[21] Appl. No.: 276,192

[22] Filed: Jul. 15, 1994

[51] Int. Cl.$^6$ ........................................ H04L 9/00
[52] U.S. Cl. .................. 380/49; 380/21; 380/29
[58] Field of Search ................... 380/21, 29, 49

[56] References Cited

U.S. PATENT DOCUMENTS

| | | | |
|---|---|---|---|
| 3,798,360 | 3/1974 | Feistel | 380/29 |
| 5,253,294 | 10/1993 | Maurer | 380/21 |
| 5,305,384 | 4/1994 | Ashby et al. | 380/29 |

FOREIGN PATENT DOCUMENTS

| | | | |
|---|---|---|---|
| 0095923 | 5/1983 | European Pat. Off. | H04K 1/06 |
| 0464562 | 6/1991 | European Pat. Off. | H04L 29/06 |
| 1447301 | 4/1964 | Germany. | |
| 5-102960 | 10/1991 | Japan | H04L 9/00 |

OTHER PUBLICATIONS

Proceedings of the 1990 IEEE Computer Society Symposium on Research in Security and Privacy, 7 May 1990, New York, pp. 249–259, "A Security Architecture and Mechanism for Data Confidentiality in TCP/IP Protocols", R. Ramaswamy.

*Primary Examiner*—Salvatore Cangialosi
*Attorney, Agent, or Firm*—Joscelyn G. Cockburn

[57] ABSTRACT

The present invention provides a simple encryption method and system for encrypting data into a plurality of control and encrypted data blocks. The data to be encrypted is divided into data segments which can be of varying length. Each control block comprises the information necessary to decrypt the data contained in the encrypted data block, such as the encryption function and associated key used to encrypt a data segment, the start position of an encrypted data segment within the encrypted data block and the length of the encrypted data block. Both the control block and the encrypted data block are padded with random numbers and the start position of the encrypted data with the encrypted data block can vary.

18 Claims, 6 Drawing Sheets

| RANDOM NUMBER | CONTROL BLOCK FORMAT | |
| --- | --- | --- |
| 1 | $L_1$ \| S \| X \| $L_2$ \| X \| F \| X \| K \| C | $CB_1$ |
| 2 | X \| $L_1$ \| X \| S \| $L_2$ \| K \| X \| F \| C | $CB_2$ |
| . . . | . . . | |
| I | F \| X \| K \| S \| $L_1$ \| X \| X \| $L_2$ \| C | $CB_1$ |

Figure 5

ENCRYPTION METHOD AND SYSTEM

The present invention relates to a data encryption method and system.

Encryption systems and methods have a wide range of applicability. For example, they are used in communication systems, such as cellular telephones or local area networks, wherein the data exchanged is confidential and it is desired to preserve the quality of confidence of the data.

The effectiveness of an encryption system partly depends upon the complexity of the encryption method employed. Simple prior art encryption methods involve, for example, permuting the letters of the English alphabet to form a permuted alphabet. Each letter of the data to be encrypted is substituted by a corresponding letter chosen from the permuted alphabet. However, simple encryption methods are prone to being easy to decrypt by an unauthorised recipient of the encrypted data. Therefore, the complexity of encryption methods has increased over the years.

As the complexity of encryption methods increases the time taken to encrypt and subsequently decrypt data also increases. It is desirable that the encryption time be kept low to increase the efficiency of, for example, a communication system employing the encryption method while retaining the high complexity of the encryption method. In order to compensate for increase in encryption time dedicated hardware is often used to implement the encryption and decryption methods. U.S. Pat. No. 5,257,282 discloses a high speed code sequence generator comprising a plurality of low speed shift registers which are algebraically combined and multiplexed to produce a high speed composite code sequence. Japanese PUPA 05-102960 discloses a cipher system in which a cipher rule is randomly selected at the beginning of each communication. The same selected cipher rule is used to encrypt data throughout the whole communication. U.S. Pat. No. 5,261,003 discloses a data communication system and method with data scrambling in which one of a plurality of keys is used for scrambling data, The key selected is dependent upon the input data to be scrambled.

Other encryption methods exist, such as the Data Encryption Standard (DES), which again are implemented in special purpose hardware in order to achieve an acceptable processing time. However, DES has associated security restrictions which can limit its distribution.

Therefore, the prior art lacks a simple encryption method which provides encrypted data which is difficult to decrypt by an unauthorised recipient and which also has a relatively short encryption axed decryption time.

Accordingly the present invention provides a method for encrypting data comprising a plurality of data segments into a plurality of encrypted data blocks and associated control blocks, the method comprising the steps of, for each data segment,
selecting one of a plurality of encryption functions,
encrypting the data segment using the selected encryption function to form an encrypted data segment,
producing an encrypted data block comprising the encrypted data segment,
producing for the encrypted data block an associated control block comprising an indication of the encryption function used to encrypt the data.

The use of multiple encryption techniques for the same data set makes unauthorised decryption very difficult, even though the individual encryption techniques used are relatively simple and so can be computed very easily and quickly. Such an encryption process has wide applicability, for example in secure communications, in the storage of classified material, and so on.

To further enhance the security of the data, it is desirable to be able to select or alter the values of at least one out of the total length of the encrypted data block, the length of an encrypted data segment within an encrypted data block, and the start position of an encrypted data segment within an encrypted data block (in the current embodiment the first of these is fixed, with the second and third being selected, but any combination could be selectable). Although such selections could be made according to a predetermined pattern, or some known parameter (eg the date), a preferred solution is to select these quantities on the basis of randomly generated numbers (such selections would obviously need to meet restraints such that the length of the encrypted data segment is less than the length of the encrypted data block that contains it).

If the starting position of the encrypted data can vary within the encrypted data block preferably the control block comprises an indication of the starting position of the encrypted data segment within the encrypted data block (although this information could be supplied by some separate mechanism). Likewise, the control block may comprise an indication of the total length of the encrypted data block and the length of the data segment as appropriate. That is, if variable values are used for the length of the data segment, the length of the encrypted data block or the position of the encrypted data segment within the encrypted data block, then those values are preferably included in the control block.

Most encryption functions utilise an encryption key to encrypt data in conjunction with the encryption function. In order to decrypt the code both the encryption function and the key must be known thereby providing greater security. Therefore the present invention provides a method further comprising the step of selecting an encryption key from a plurality of encryption keys for use with the selected encryption function used to encrypt the data segment.

To avoid the need for the encryption keys to be exchanged between a supplier of encrypted data and the recipient thereof in order to be able to decrypt the encrypted data, it is desirable to provide an indication of the encryption key used to encrypt the data within the control block.

A control block having a fixed format is more readily deciphered than a control block whose format varies with each data segment to be encrypted.

Accordingly, it is possible to provide a method further comprising the step of selecting one of a plurality of predetermined control block formats and wherein a predetermined position of each control block further contains an indication of the predetermined format of the control block.

The invention also provides a system for encrypting data comprising a plurality of data segments into a plurality of encrypted data blocks and associated control blocks, comprising:
means for selecting for each data segment one of a plurality of encryption functions;
means for encrypting for each data segment the data segment using the selected encryption function to form an encrypted data segment;
means for producing for each data segment an encrypted data block comprising the encrypted data segment;
and means for producing for each data segment a control block associated with the encrypted data block comprising an indication of the encryption function used to encrypt the data.

The invention further provides a method for decrypting data encrypted from a plurality of data segments into a plurality of encrypted data blocks and associated control blocks using a plurality of encryption functions, the method comprising the steps of:

reading a control block and an associated encrypted data block;

determining an encryption function from the information in the control block used with the associated encrypted data block;

and decrypting a data segment from the encrypted data block based on the determined encryption function.

Figure 3:
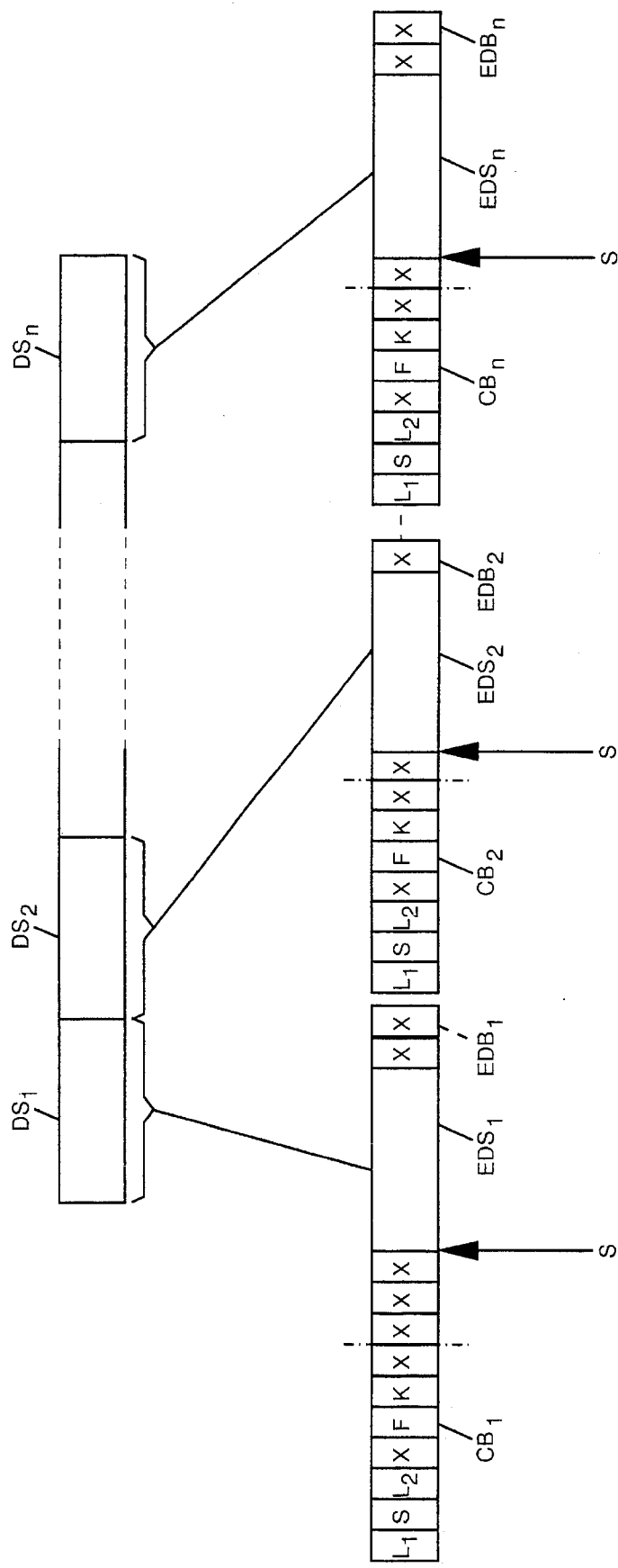
Figure 4:
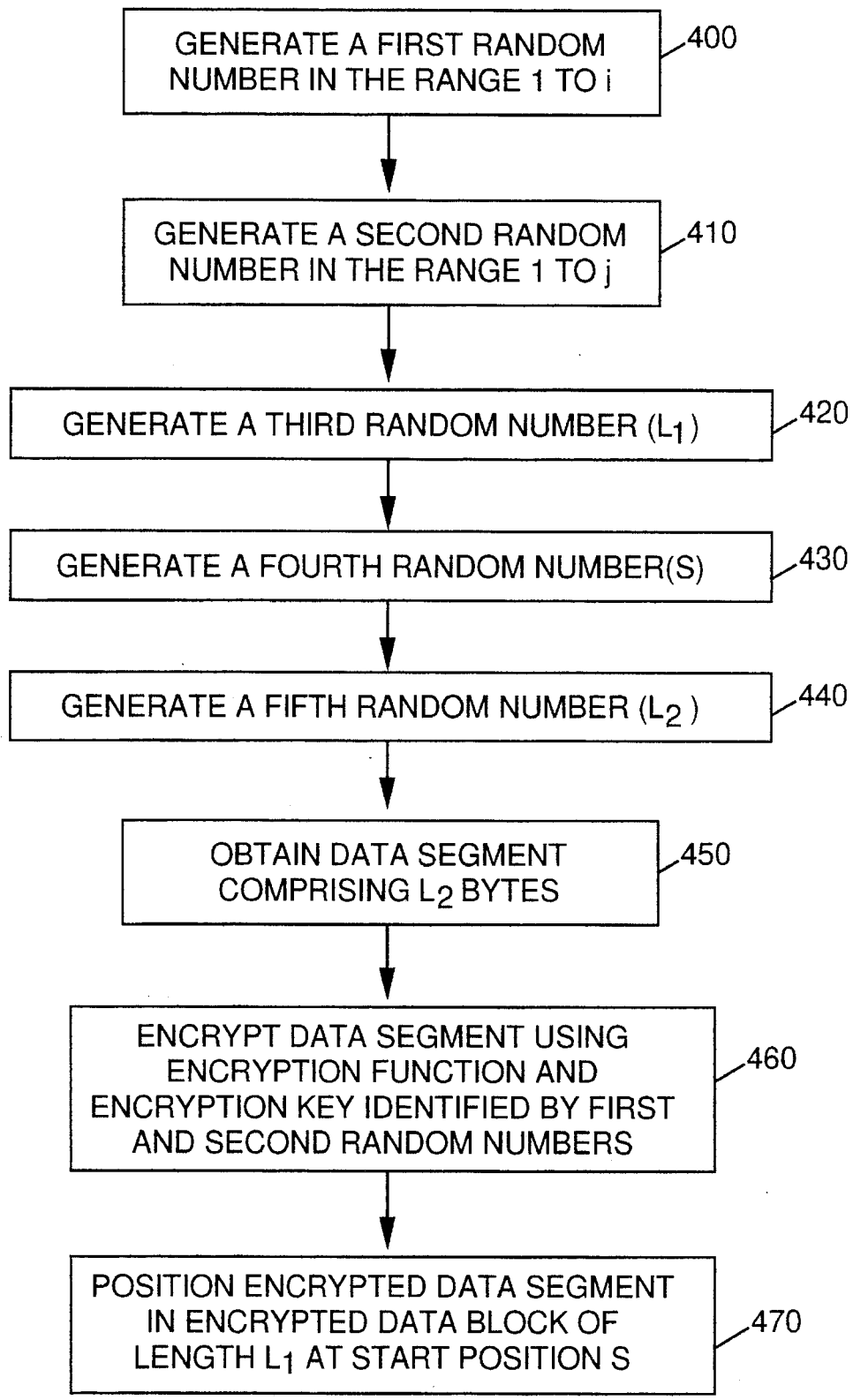
Figure 6:
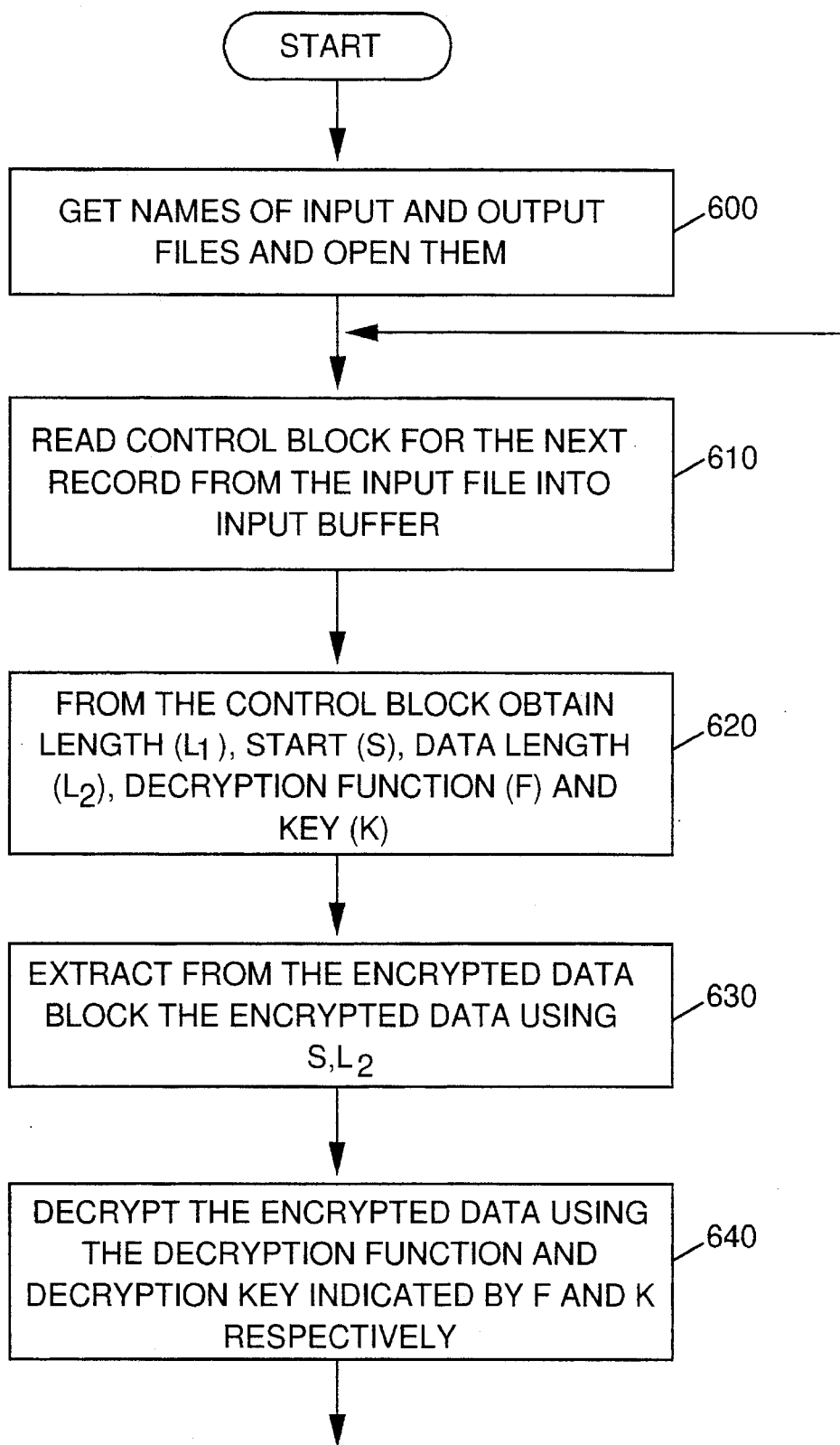
Figure 7:
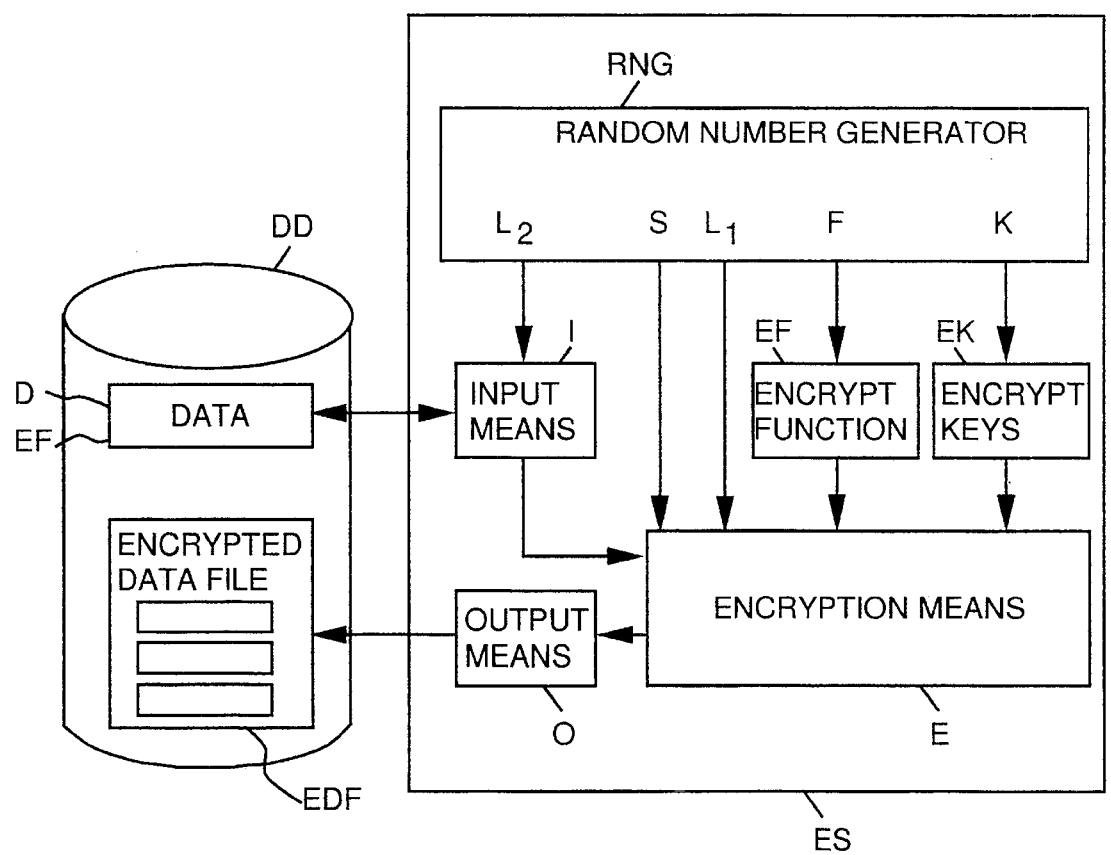

An embodiment of the present invention will now be described by way of example only with reference to the accompanying drawings in which:

FIG. 1 shows the data to be encrypted and a data segment before and after encryption, FIG. 2 illustrates how different encryption functions are selected according to a random number, FIG. 3 shows the data encrypted into a plurality of associated control blocks and encrypted data blocks and associated control blocks, FIG. 4 shows a flow diagram illustrating the steps of an encryption method, FIG. 5 illustrates how time format of the control block is selected according to a generated random number, FIG. 6 shows a decryption flow diagram, FIG. 7 shows schematically an encryption system, In FIG. 1 there is shown data (D) to be encrypted. The data is divided up into a plurality of data segments. The length of each data segment (DS) varies and is determined by a respective random number ($L_2$) generated for each data segment. The encrypted data comprises a control block (CB) and an encrypted data block (EDB) for each data segment (DS). The encrypted data block (EDB) includes an encrypted data segment (EDS) (i.e. a segment that actually contains the original data segment in encrypted form). The control block (CB) comprises a plurality of fields containing information concerning the format of the data bytes in the encrypted data block (EDB), in particular the encryption function (F) and encryption key (K) used to encrypt the data segment (DS) and an indication of the starting position (S) of the encrypted data segment (EDS) within the encrypted data block (EDB) which is chosen at random. The control block (CB) and the encrypted data block (EDB) are also padded with random numbers (X).

The fields of the encrypted data are as follows:

$L_1$=the length of an encrypted data block (EDB),

S=the start position of an encrypted data segment (EDS) within an encrypted data block, $L_2$=the number of bytes in a data segment (DS) to be encrypted, F=an indication of the encryption function used to encrypt a data segment, K=an indication of the encryption key used to encrypt a data segment, EDS=an encrypted data segment, and X=random numbers.

The encryption function in conjunction with an encryption key translates each byte of the data segment into a corresponding encrypted byte and can be represented generally as EDS=F(K,D) where EDS and K have the values indicated above and D is the data segment being encrypted. The mapping of D to EDS can be selected arbitrarily and does not have to be performed on a byte by byte basis. Examples of suitable encryption functions are:

1. EDS=K exclusive-or D,
2. EDS=shift left D by K bits,
3. EDS=re-arrange the order of the bits in D.

Referring to FIG. 2, different encryption functions and encryption keys selected from the range of available encryption functions ($F_1$ to $F_i$) and encryption keys ($K_1$ to $K_j$) are used to encrypt each data segment ($DS_1$ to $DS_n$). The encryption function used to encrypt a data segment is determined by generating a first random number within a predetermined range (1 to i) and mapping that random number to one of the encryption functions ($F_1$ to $F_i$). Similarly, the encryption key used to encrypt a data segment is determined by selecting a second random number from a predetermined range (1 to j) and mapping that number to one of the encryption keys ($K_1$ to $K_j$). Therefore, when each data segment ($DS_1$ to $DS_n$) has been encrypted the total encrypted code will comprise a plurality of encrypted data blocks ($EDB_1$ to $EDB_n$) and associated control blocks ($CB_1$ to $CB_n$) as illustrated in FIG. 3.

There need not be a one to one mapping between the random numbers and the corresponding encryption functions or encryption keys. A particular range of random numbers can be mapped to the same encryption function or encryption key thereby reducing the number of encryption functions and encryption keys needed to implement an embodiment of the present invention as illustrated in Table 1 below.

Referring to FIG. 4 there is shown flow diagram illustrating the steps of an encryption method according to the present invention. At step 400 a first random number is generated from a predetermined range to select the encryption function ($F_1$ to $F_i$) to be used to encrypt a data segment. Step 410 generates a second random number from a second predetermined range to select the encryption key ($K_1$ to $K_j$) to be used with the selected encryption function to encrypt the data segment. A third random number ($L_1$) is generated within a predetermined range at step 420 to determine the total length ($L_1$) of the encrypted data block (EDB). At step 430 a fourth random number (S) within a range determined by the third random number is generated which identifies the start position (S) of the encrypted data segment (EDS) within the encrypted data block (EDB). Finally, step 440 generates a fifth random number ($L_2$) within a range determined by the third ($L_1$) and fourth (S) random numbers to determine the size of data segment to be encrypted.

If space is limited it may be desirable to restrict the selection range for the fourth random number to $0<S<L_1/2$ and the selection range for the fifth random number to $(L_1-S)/2<L_2<L_1- S$, although any appropriate range can be selected.

Step 450 obtains the next $L_2$ bytes of data, forming a data segment. Each byte of a data segment is encrypted using the respective selected encryption function and selected encryption key at step 460. An encrypted data segment is positioned in an encrypted data block beginning at a start position determined by a corresponding fourth random number at step 470. The generated random numbers ($L_1$, S, $L_2$, F and K) are then placed in a control block according to a predetermined format. The remaining fields of the control block and the encrypted data block are padded with random numbers (X) as illustrated in FIG. 1.

Although the embodiment of the present invention described herein uses the same format control block for each encrypted data block, a varying format can equally well be used. In such a case, each format may be chosen from a plurality of control blocks formats ($CB_1$ to $CB_1$) by generating a sixth random number from a predetermined range which maps to one of the plurality of possible control block formats ($CD_1$ to $CD_1$) as illustrated in FIG. 5 ($L_1$, S, $L_2$, F and K have the same meaning as above). Each control block ($CB_1$ to $CB_1$) would require a further field (C) to contain an identification of the particular format of the control block used. Using such a technique to vary the format of the control block further increases the difficulty of deciphering the contents of the control blocks and hence also increases the difficulty of decrypting the encrypted data segment. Alternatively, if a particular sequence of control block formats was established such that both the encryption and decryption methods conformed to that sequence, the information contained in the control block could be deciphered Without the need to provide an indication therein of the particular control block format utilised.

Further, such a technique could be used to obviate the need to generate several random numbers and the need for separate control blocks and data blocks. A single random number could be used to identify the format of the encrypted data, the fields of the above control block and the encrypted data block being merged. Each field would contain a predetermined value representative of the format of the whole encrypted block. Encrypting according to this technique would reduce the encryption time at the expense of initially generating the corresponding encrypted data formats and associated values. However, the corresponding encrypted data formats and values need only be generated once.

Each encrypted data (ED) is written to a storage medium as a file of records for further processing or can be transmitted to an intended recipient using a local area network or other transmission medium.

Referring to FIG. 6 there is shown a decryption flow diagram, assuming the encrypted data is stored as a file of records. At step 600 the file containing the records of the encrypted data is opened. Step 610 retrieves the next record from the file. As the format of the control block is known, assuming an embodiment having a fixed format control block, step 620 extracts the values $L_1$, S, $L_2$, F and K from the control block. The values S and $L_2$ are used to identify the encrypted data segment (EDS) at step 630. The values of F and K are used to decrypt the encrypted data segment (EDS) at step 640 by mapping the value of F to a decryption function which is the inverse of a corresponding encryption function together with the key (K). The steps 600 to 640 are repeated for all records in the file (note that the value of $L_1$ can be used to locate the control block for the subsequent data segment).

Rather than storing the control block and the encrypted data block together in the same record an embodiment of the invention can be realised in which they are stored separately. Each control block is stored as a record and the encrypted data blocks are stored in a separate file as contiguous bytes. Accordingly, when the decryption data is extracted from the control bloc:, the next $L_1$ bytes are read from the file containing the encrypted data blocks. The $L_1$ bytes are then decrypted as above.

Referring to FIG. 7 there is shown schematically an encryption system (ES) according to an embodiment of the present invention comprising a disc drive (DD) for storing a file (FF) containing the data (D) to be encrypted; means (RNG) for generating at least five random numbers corresponding to the values $L_1$, S, $L_2$, F and K; means (I) for reading the next available $L_2$ bytes, corresponding to the number of bytes in a data segment to be encrypted, from the file (FF); means (EF) for determining the encryption function to be used to encrypt the data; means (EK) for determining the encryption key to be used to encrypt the data; means (E) for encrypting a data segment and producing the encrypted data comprising a control block (CB) and an encrypted data block (EDB) and means (O) for writing a record containing the encrypted data to an encrypted data file (EDF).

Table 1 below shows the C language code which is used to implement an embodiment of the present invention. The C language code below can be executed on any computer which supports a C language environment. A suitable computer would be, for example, an IBM Personal Computer PS/2.

TABLE 1

```
(c) IBM Corporation 1994. All rights reserved.
/* Record structure */
typedef struct btrec    /* record */
{
ULONG funcnum;          /* Encode function number 0-> none */
ULONG key;              /* Key for function (N/A if no func) - max key
                           value = 64k - 1 */
ULONG length;           /* Length of following data */
ULONG start;            /* start position of the encrypted data */
ULONG cntrlblock[20]    /* control block */
UCHAR data[5001;        /* Data */
} BTREC;
typedef BTREC FAR * PBTREC;
/* Encryption and decryption functions
#define ENCODE1(d,k) (UCHAR)(d     (UCHAR)k)
#define ENCODE2(d,k) (UCHAR)((UCHAR)(~d)    (UCHAR)k)
#define ENCODE3(d,k) (UCHAR)(d     (UCHAR)~k)
#define DECODEI(d,k) (UCHAR)(d     (UCHAR)d)
#define DECODE2(d,k) (UCHAR)(~(UCHAR)(d    (UCHAR)k))
#define DECODE3(d,k) (UCHAR)(d     (UCHAR)~k)
/* Name:NewKey */
/* Description: Returns a key to use in the translation */
USHORT NewKey(VOID)
{
USHORT key;     /* Key */
/* Work out the key from a random number */
key = (USHORT)rand();
/* return random number */
return (key);
}
/* Name:       NewFunc */
/* Description:   Returns a function number to use in the translation */
```

TABLE 1-continued

```
ULONG NewFunc(VOID)
{
ULONG func;                    /* Function number */
/* Work out the function number from a random number */
func = (ULONG)rand();
if (func < 10000) func = 1;
else if (func < 20000) func = 2;
else func = 3;
/* return the function number */
return(func);
}
/* Name:       NewLength */
/* Description:   Returns a random length between two bounds */
/* Input: Lower bound */
/* Upper bound */
/* Returns: Length */
SHORT NewLength(SHORT lower, SHORT upper)
{
SHORT len;                                      /* Length */
SHORT r;                                        /* Random number */
SHORT i;                                        /* Work variable */
/* Get a random number */
r = (SHORT)rand();
/* Map it to the range and get the length */
j = MAX_RANDOM_NUMBER/(upper − lower + 1);
len = lower + r/j;
return(len);
}
/* Name:       FillStdData */
/* Description:   Fill in the standard part of a data record, using
                  random numbers to avoid patterns and select an
                  encryption function and an encryption key. */
VOID FillStdData(PBTREC pbtrec)
{
ULONG i;        /* Count */
/* Fill the standard part of tlie record with random numbers */
for(i = 1; i <= 500; i++)
    pbtrec-> data[i] = (CHAR)rand();
for(i = 1; i <= 20; i++)
    pbtrec-> cntrlblock[i] = (ULONG)rand();
pbtrec-> start = 0;
pbtrec-> length = NewLengtli(30,100); /* assigns random no. in range 30 to
                                          100 */
pbtrec-> funcnum = NewFunc();
pbtrec-> key = NewKey();
return;
}
/* Name:       StartPos */
/* Description:   Determines the start position of the data in data[] */
VOID StartPos(PBTREC pbtrec)
{
/* select start position such that data fits into array, data[] */
while(pbtrec-> start > 500-pbtrec-> length)
    pbtrec-> start = (ULONG)rand();
return;
}
/* Name:       ApplyFunc */
/* Description:   Encode the data by applying the function and key and
                  place in data[] at selected start position. */
/* Input:       Pointer to record */
VOID ApplyFunc(PBTREC pbtrec)
{
ULONG i; /* Count */
/* Process according to the function number */
if (pbtrec -> funcnum == 1)
{
    for (i = 0; i < pbtrec -> length; i++)
        pbtrec -> data[i + pbtrec -> start] = ENCODE1(pbtrec -> data[i],pbtrec -> key);
}
else if (pbtrec -> funcnum == 2)
{
    for (i = 0; i < pbtrec -> length; i++)
        pbtrec -> data[i + pbtrec -> start] = ENCODE2(pbtrec -> data[i],pbtrec -> key);
}
else if (pbtrec -> funcnum == 3 || pbtrec -> funcnum != 0)
{
    for (i = 0; i < pbtrec -> length; i++)
        pbtrec -> data[i + pbtrec -> start] = ENCODE3(pbtrec -> data[i],pbtrecl> key);
}
```

TABLE 1-continued

```
return;
}
/* Name:         TxData */
/* Description:  Transfer the control data into the control block */
VOID TxData(PBTREC pbtrec)
{
    pbtrec -> cntrlblock[1] = pbtrec -> length;
    pbtrec -> cntrlblock[4] = pbtrec -> start;
    pbtrec -> cntrlblock[9] = pbtrec -> funcnum;
    pbtrec -> cntrlblock[15] = pbtrec -> key;
    return;
}
```

The record structure "btrec" describes the format of the information contained in the record containing the encrtyped data. The control block, cntrlblock[], comprises a plurality of values from the following fields "funcnum", "key", "length", "start" which correspond to F, K, $L_2$ and S above. The encrypted data block is represented by the array "data [500]" and therefore $L_1$ is fixed at 500 (therefore there is no need to store its value in the control block). As indicated above the invention is not limited to a fixed length encrypted data block and the code above can be readily modified to implement an embodiment having a variable length encrypted data block.

The encryption and decryption functions are defined by the functions "ENCODE1", "ENCODE2", "ENCODE3" and "DECODE1" "DECODE2" "DECODE3". It can be seen that the decryption functions are the inverse of the encryption functions. ENCODE1 performs a bit-wise exclusive-or between a byte of data, d, and an encryption key, k, ENCODE2 performs a bit-wise exclusive-or between the one's complement of a byte of data, d, and an encryption key, k and ENCODE3 performs the a bit-wise exclusive-or between a byte of data, d, and the one's complement of an encryption key, k. The decryption functions "DECODE" perform the inverse of the "ENCODE" functions. The present invention is not limited to using the "ENCODE" and "DECODE" functions defined above and an embodiment can equally well be realised using other encryption and decryption functions.

The function "NewKey" generates a new encryption key each time the function is called. In the embodiment described herein the key is a random number.

The function "NewFunc" returns an indication of which encryption function is to be used for encrypting a data segment. One of three functions is selected according to the range within which a generated random number falls.

The function "NewLength" return a random number within a given range defined by "lower" and "upper". The function is used to determined the length of the data segment to be encoded by setting pbtrec→length to the return value of the function. Note that in the present embodiment the length is restricted to a maximum value of 100, so that most of the encrypted data block is in fact padding. If space or bandwidth was more limited, the amount of padding could be greatly reduced (or even eliminated).

The function "FillStdData" initialises the arrays cntrlblock[] and data[] with random numbers, sets the start position data to zero, selects the length of the data segment and selects the encryption function and key to be used to encrypt the data segment.

The function "StartPos" generates a random start position for the encrypted data segment within the array data[i] which is such that the encrypted data segment will always fit into the data array, data[].

The function "ApplyFunc" encrypts the data segment by applying the selected encryption function and key to each byte within the data segment. According to the encryption function selected one of the three "ENCODE" functions is called, passing the data to be encrytped, data[i], and the encryption key, pbtrec→key, to that function. The encrypted data is stored in the data array, pbtrec→data [i+pbtrec→start], of record btrec.

The function "TxData" transfers the control information into the array "cntrlblock[]" such that the control block has a fixed format. The control block and encrypted data block can then be transmitted to an intended recipient or stored for latex- processing as appropriate. Further, the control blocks and the encrypted data blocks can be stored or transmitted separately.

Therefore the two arrays, cntrlblock[] and data[], contain the encryption information and the encrypted data block respectively from which decryption can be effected.

Although the embodiment of the present invention described herein uses encryption and decryption functions which operate on a byte at a time, the encryption and decryption functions may operate on several bytes at a time.

Further, a plurality of separate data segments may be encrypted and stored in the same encryption data block, each having their respective encryption functions, key, start positions and lengths stored in the control block.

I claim:

1. A method for encrypting data comprising a plurality of data segments ($DS_1$ to $DS_n$) into a plurality of encrypted data blocks ($EDB_1$ to $EDB_n$) and associated control blocks ($CB_1$ to $CB_n$), the method comprising the steps of, for each data segment, providing a plurality of encryption functions ($F_1$ to $F_i$), said plurality of encryption functions to be used to encrypt the plurality of data segments;

selecting one of the plurality of encryption functions ($F_1$ to $F_i$);

encrypting the data segment using the selected encryption function to form an encrypted data segment;

producing an encrypted data block comprising the encrypted data segment; and producing for the encrypted data block an associated control block comprising an indication of the encryption function used to encrypt the data.

2. A method as claimed in claim 1 wherein the control block further comprises an indication for a total length of $L_1$ of the encrypted data block, a length of $L_2$ of the data encrypted segment or a starting position (S) of the encrypted data segment within the encrypted data block, as appropriate.

3. A method as claimed in claim 2, further comprising the step of selecting the total length ($L_1$) of the encrypted data block for each data segment.

4. A method as claimed in claim 2 further comprising the step of selecting the length of each encrypted data segment ($L_2$) with each encrypted data block.

5. A method as claimed in claim 2, further comprising the step of selecting the starting position (S) of the encrypted data segment within the encrypted data block.

6. A method as claimed in claim 2 wherein the total length ($L_1$) of the encrypted data block, the length ($L_2$) of the encrypted data segment, or the starting position (S) of the encrypted data segment within the encrypted data block is selected randomly.

7. A method as claimed in claim 6, further comprising the step of filling the fields of the encrypted data block which do not contain the encrypted data segment with random numbers (X).

8. The method of claim 1 wherein the encryption step further comprises the step of using a different one of the plurality of encryption functions for encrypting each of the plurality of data segments.

9. The method of claim 1 further including the steps of providing a plurality of encryption keys ($K_1$ to $K_j$);

selecting one of the plurality of encryption keys; and encrypting the data segment using the selected encryption key to form the encrypted data segment.

10. A method as claimed in claim 9, wherein the control block includes an indication of the selected encryption key (K).

11. A method as claimed in claim 10, wherein the control block further comprises random numbers (X) in the fields not occupied by other information.

12. A method as claimed in claim 11, further comprising the step of selecting one of a plurality of predetermined control block formats ($CB_1$ to $CB_1$) and wherein a predetermined position of each control block further contains an indication (C) of the predetermined format of the control block.

13. A system for encrypting data comprising a plurality of data segments ($DS_1$ to $DS_n$) into a plurality of encrypted data blocks ($EDB_1$ to $EDB_n$) and associated control blocks ($CB_1$ to $CB_n$), comprising:

means for providing a plurality of encryption functions;

means for selecting for each data segment one of the plurality of encryption functions ($F_1$ to $F_i$);

means for encrypting for each data segment the data segment using the selected encryption function to form an encrypted data segment;

means for producing for each data segment an encrypted data block comprising the encrypted data segment;

and means for producing for each data segment a control block associated with the encrypted data block comprising an indication of the encryption function used to encrypt the data.

14. A method for decrypting data encrypted from a plurality of data segments ($DS_1$ to $DS_n$) into a plurality of encrypted data blocks ($EDB_1$ to $EDB_n$) and associated control blocks ($CB_1$ to $CB_n$) the method comprising the steps of:

reading a control block and an associated encryption data block;

determining, from the information in the control block one of a plurality of encryption Functions ($F_1$ to $F_i$) used with the associated encrypted data block;

and decrypting a data segment from the encrypted data block based on the determined one of a plurality of encrypting functions ($F_1$ to $F_i$).

15. The method of claim 14, wherein the control block also contains one of a plurality of encryption keys for use with the encryption function.

16. A system for decrypting data encrypted from a plurality of data segments ($DS_1$ to $DS_n$) into a plurality of encrypted data blocks ($EDB_1$ to $EDB_n$) and associated control blocks ($CB_1$ to $CB_n$), the system comprising:

means for reading a control block and an associated encrypted data block;

means for determine one of a plurality of encryption functions ($F_1$ to $F_i$) from the information in the control block used with the associated encrypted data block;

and means for decrypting a data segment from the encrypted data block based on the determined one of the plurality of encryption functions.

17. A system for encrypting data sets comprising of a plurality of data segments ($DS_1$ to $DS_n$) into a plurality of encrypted data blocks ($EDB_1$ to $EDB_n$) and associated control blocks ($CB_1$ to $CB_n$) comprising:

means for encrypting each data segment of a data set with a different encryption function selected from a plurality of encryption functions ($F_1$ to $F_i$); and means for producing for each data segment an encrypted data block comprising the encrypted data segment.

18. The system of claim 17 further including means for producing for each data segment a control block associated with the encrypted data block comprising an indication of the encryption function used to encrypt the data.

* * * * *